United States Patent
Atkinson (10) Patent No.: US 7,609,472 B2
(45) Date of Patent: Oct. 27, 2009

(54) POWER AND THERMAL MANAGEMENT FOR A HARD DRIVE

(75) Inventor: Lee W. Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 10/858,193

(22) Filed: Jun. 1, 2004

(65) Prior Publication Data
US 2005/0265140 A1    Dec. 1, 2005

(51) Int. Cl.
G11B 21/02    (2006.01)
(52) U.S. Cl. .................... 360/75; 360/69; 360/97.02
(58) Field of Classification Search .............. 360/69, 360/78.06, 78.04, 78.09, 78.12, 75, 46, 59, 360/97.02; 369/44.17, 19, 47.44
See application file for complete search history.

(56) References Cited

U.S. PATENT DOCUMENTS

| | | | |
|---|---|---|---|
| 5,345,347 A * | 9/1994 | Hopkins et al. ............... 360/71 |
| 5,381,279 A * | 1/1995 | Dunn ........................... 360/70 |
| 5,523,721 A * | 6/1996 | Segawa et al. ................. 330/86 |
| 5,544,138 A * | 8/1996 | Bajorek et al. ............ 369/53.42 |
| 5,682,273 A * | 10/1997 | Hetzler ......................... 360/75 |
| RE36,189 E | 4/1999 | Carter et al. |
| 6,266,203 B1 * | 7/2001 | Street et al. .................... 360/69 |
| 6,417,639 B1 * | 7/2002 | Schillaci et al. .............. 318/560 |
| 6,496,319 B1 * | 12/2002 | Kusumoto et al. ............. 360/75 |
| 6,563,658 B2 * | 5/2003 | Koizumi et al. ................ 360/69 |
| 6,731,453 B2 * | 5/2004 | Korbel et al. ............. 360/78.04 |
| 6,865,506 B1 | 3/2005 | Escobar et al. |
| 7,072,138 B2 * | 7/2006 | Schmidt .................. 360/78.04 |
| 2003/0048571 A1 * | 3/2003 | Soyama et al. ........... 360/78.06 |
| 2005/0174678 A1 * | 8/2005 | Zayas et al. .............. 360/73.03 |

* cited by examiner

Primary Examiner—Tan X Dinh (57) ABSTRACT

According to certain embodiments of the present invention, a data storage device is provided. The exemplary data storage device includes actuation mechanism control circuitry configured to selectively operate an actuation mechanism at first and second performance levels, wherein the first performance level accesses data from a data storage medium at a faster rate than the second performance level.

11 Claims, 6 Drawing Sheets

POWER AND THERMAL MANAGEMENT FOR A HARD DRIVE

BACKGROUND

The performance demands of software may require the retrieval of large amounts of data from data storage devices, such as a compact disk (CD), a digital video disk (DVD), or a hard disk. Data is typically stored in discrete locations, often called sectors, on such data storage devices. Accordingly, to access this data, a reading device, such as a data head, may be positioned and repositioned between the appropriate data locations, often upwards of fifty times a second. Generally, the faster the data head transitions from data location to data location, the quicker the data may be retrieved from the disk and transmitted to the appropriate system. The time to access data is typically known in the industry as seek time. By lowering the seek time, the performance level of a data device may be improved.

To facilitate this reciprocating movement between data locations, a hard-disk drive, for example, may employ an actuation mechanism that repeatedly positions the data head at an actuation rate in accordance with a single predetermined performance level, irrespective of the operating conditions. That is, traditional data storage devices statically operate at a maximum performance level or seek time. Unfortunately, the higher the performance level of traditional data devices, the greater the likelihood that the actuation mechanism generates more heat and consumes more power. Additionally, operation at a uniform performance level may generate more heat and/or consume more power than desired.

BRIEF DESCRIPTION OF THE DRAWINGS

Advantages of the invention may become apparent upon reading the following detailed description and upon reference to the drawings in which.

DETAILED DESCRIPTION

In many instances, the conservation of power and/or the reduction of operating temperatures may be more pressing concerns than optimizing data seek times. For example, excessive heat may degrade the performance of the data storage device and, in certain situations, may cause complete shut down of the device. Reduced performance is generally more desirable than no performance at all. Exemplary embodiments of the present invention provide a storage device operable at a plurality of performance levels to, for example, reduce heat generation and/or control power consumption.

Figure 1:
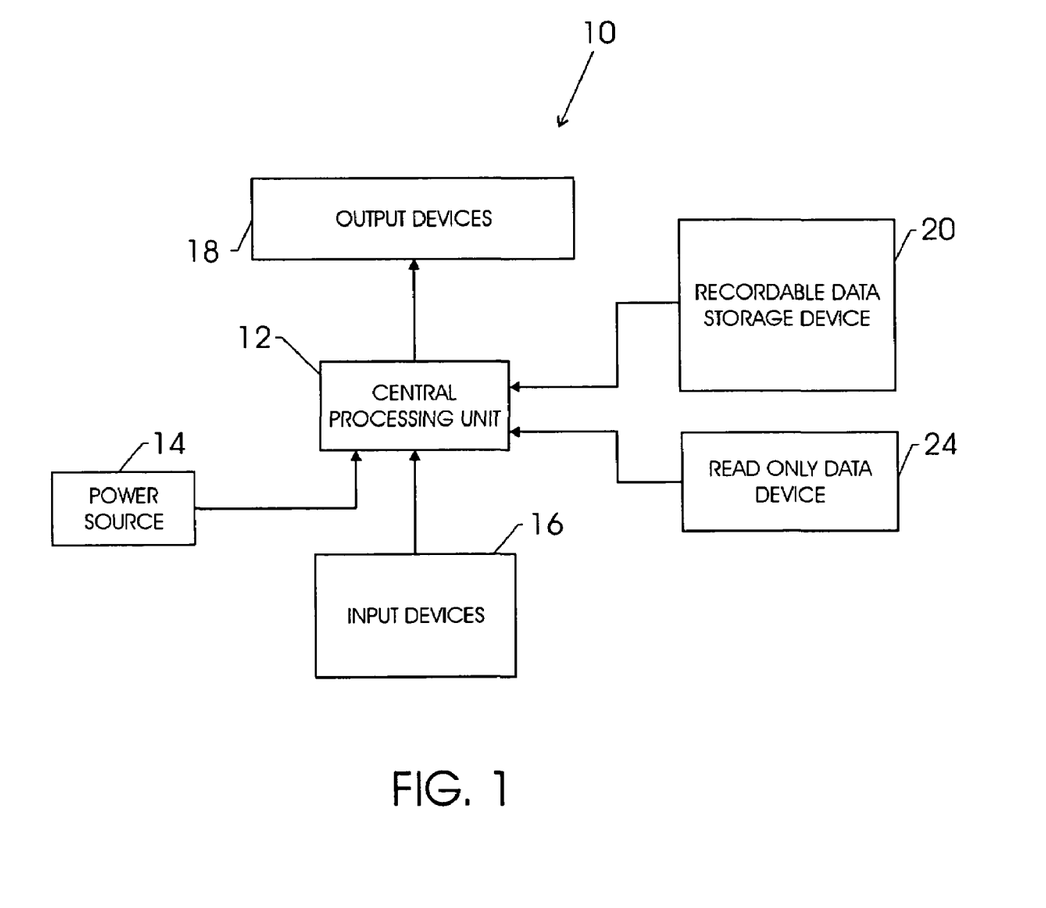
FIG. 1 is a diagrammatical representation of an exemplary computer system in accordance with an embodiment of the present invention.

Referring initially to FIG. 1, an exemplary computer system 10 is represented in diagrammatical form. By way of example, the computer system 10 may be a laptop or portable computer, a desktop computer, a server, or a mass data storage device, such as a storage area network. Moreover, it should be understood that the present invention is applicable—to a number of electronic devices, such as digital video disk (DVD) players, compact disk (CD) players, and portable audio equipment. In a broad sense, devices that employ a dynamically positioned data head may benefit from the present invention.

The computer system 10 includes a central processing unit 12 coupled to a power source 14. Generally, the power source 14 provides direct current (dc) power supplied from a battery or rectified from an alternating current (ac) power source. The computer system 10 also includes input devices 16, such as a keyboard or a mouse, in communication with the central processing unit 12. Advantageously, the input devices 16 facilitate the entry of commands and instructions for the central processing unit 12. Additionally, the computer system 10 includes output devices 18, such as display monitors or speakers. Moreover, the computer system 10 may be part of a network, such as a local area network, wide area network, storage area network, or the Internet.

In an exemplary embodiment, the central processing unit 12 communicates with data storage devices, such as a recordable data storage device 20 and a read-only data storage device 24. An exemplary recordable data storage device 20 may be a hard disk drive or a recordable CD-DVD drive, whereas an exemplary read-only data storage device 24 may be a traditional CD/DVD drive. Data storage devices 20 and 24 receive data from and transmit data to the central processing unit 12.

Figure 2:
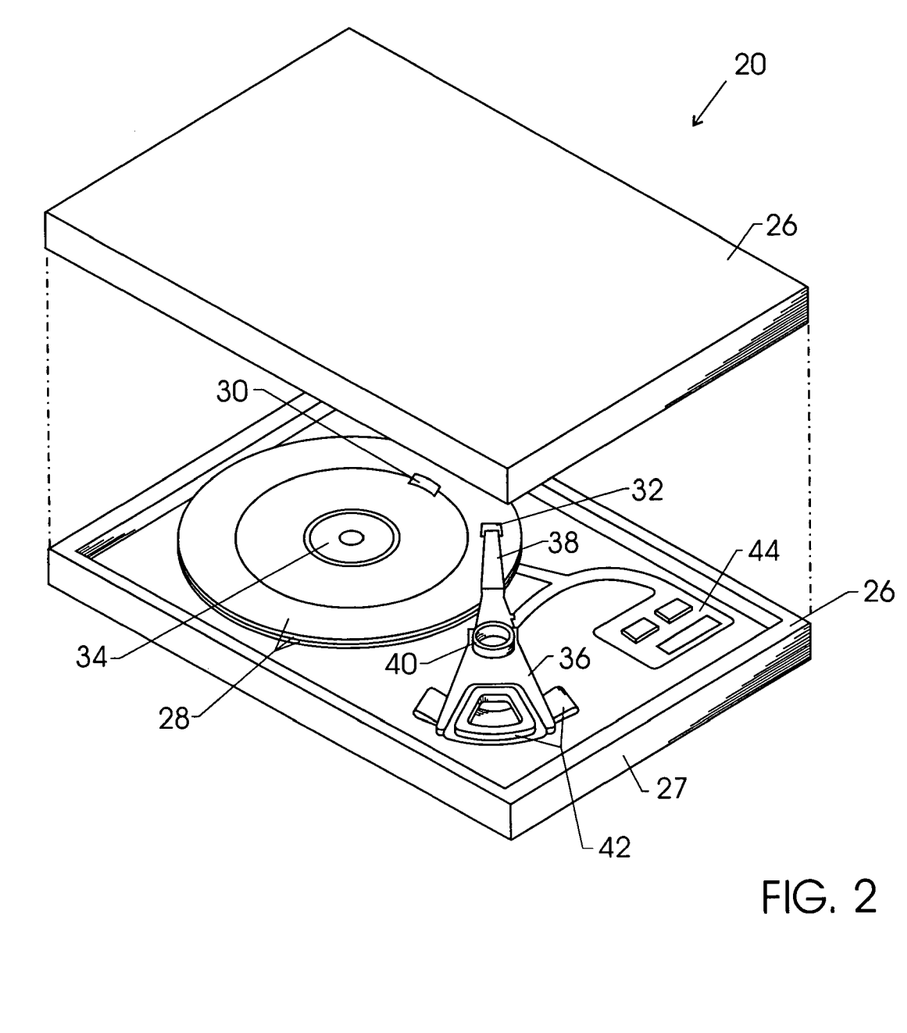
FIG. 2 is an exploded perspective view of an exemplary data storage device in accordance with an embodiment of the present invention.

FIG. 2 illustrates the hard disk drive 20. The exemplary disk drive 20 includes a housing 26, which retards the ingress of particulates and/or moisture. The hard disk drive 20 also includes a plurality of concentrically stacked disks 28. By way of example, data may be stored on both the upper surface as well as on the lower surface of each disk 28.

To retrieve data, as well as to write data, the exemplary disk drive 20 employs one or more data heads 32—one for each surface of each disk 28 that stores data. The disks 28 store data at discrete locations 30 on the surfaces of the appropriate disk 28. That is, if the surface of a disk 28 is viewed as a radial coordinate system, each bit of data is identified by its radial position on the disk 28 in conjunction with its relative angular position on the disk 28. Thus, to retrieve or store a bit of data, the data head 32 is positioned at the appropriate angular and radial coordinates on the disk 28 corresponding to the bit. To retrieve or store another bit of data, the data head 32 is repositioned at the appropriate angular and radial coordinate in the disk 28 corresponding to the bit. This dynamic positioning in the exemplary disk drive 20 is accomplished by rotating the disks 28 via a spindle motor 34 and pivoting an arm assembly 36 to which the data head 32 is attached. The arm 36 provides a support structure for the data head 32. By pivoting the arm 36 to the appropriate radial coordinate and by rotating the disk 28 to the appropriate angular coordinate, access to a number of data location 30 on the surface of the disk 28 is achieved.

During operation of the disk drive 20, the spindle motor 34 rotates the disks 28 and the arm 36 pivots the head 32. For example, the spindle motor 34 may rotate the disks 28 upwards of 7,000 RPM, while the arm 36 may pivot the head 32 from the edge of the disk 28 to its center and back upwards of 50 times per second. By rotating the disks 28, airflow that effectively floats the data head 32 above the surfaces of the disk 28 is produced within the disk drive 20. Because the floating head 32 does not make physical contact with the disk, wear to the radially pivoting data head 32 may be mitigated.

The retrieval of data is accomplished not only by rotating the disks 28 but also by pivoting the data head 32 via the arm assembly 36. The arm assembly 36 may include a flexible suspension 38 that enables the data head 32 to float during rotation of the disks 28 and supports the data head 32 when the disks 28 are not rotating. During operation, the arm 36 and, thus, the head 32 pivot about a pivot assembly 40.

In the exemplary disk drive 20, actuation or pivoting of the arm 36 is accomplished by an actuation mechanism, such as a voice coil motor 42. Although the exemplary disk drive 20 employs a voice coil motor 42, a number of other actuation mechanisms may be employed. For example, servo-motors or linear motors may also be employed. The exemplary voice coil motor 42 actuates the arm 36 in response to an electrical signal. More specifically, the voice coil motor 42 creates a magnetic field that biases the actuator arm 36 in the desired direction in response to a voltage signal. By controlling the polarity of the magnetic field, the arm 36 pivots in opposite directions.

Operation of the hard disk drive 20, particularly the actuation of the arm 36 as well as the rotation of the disks 28, is controlled by device circuitry 44. The exemplary device circuitry 44 includes a number of sub-circuits collectively configured to control both the voice coil motor 42 and the spindle motor 34.

Figure 3:
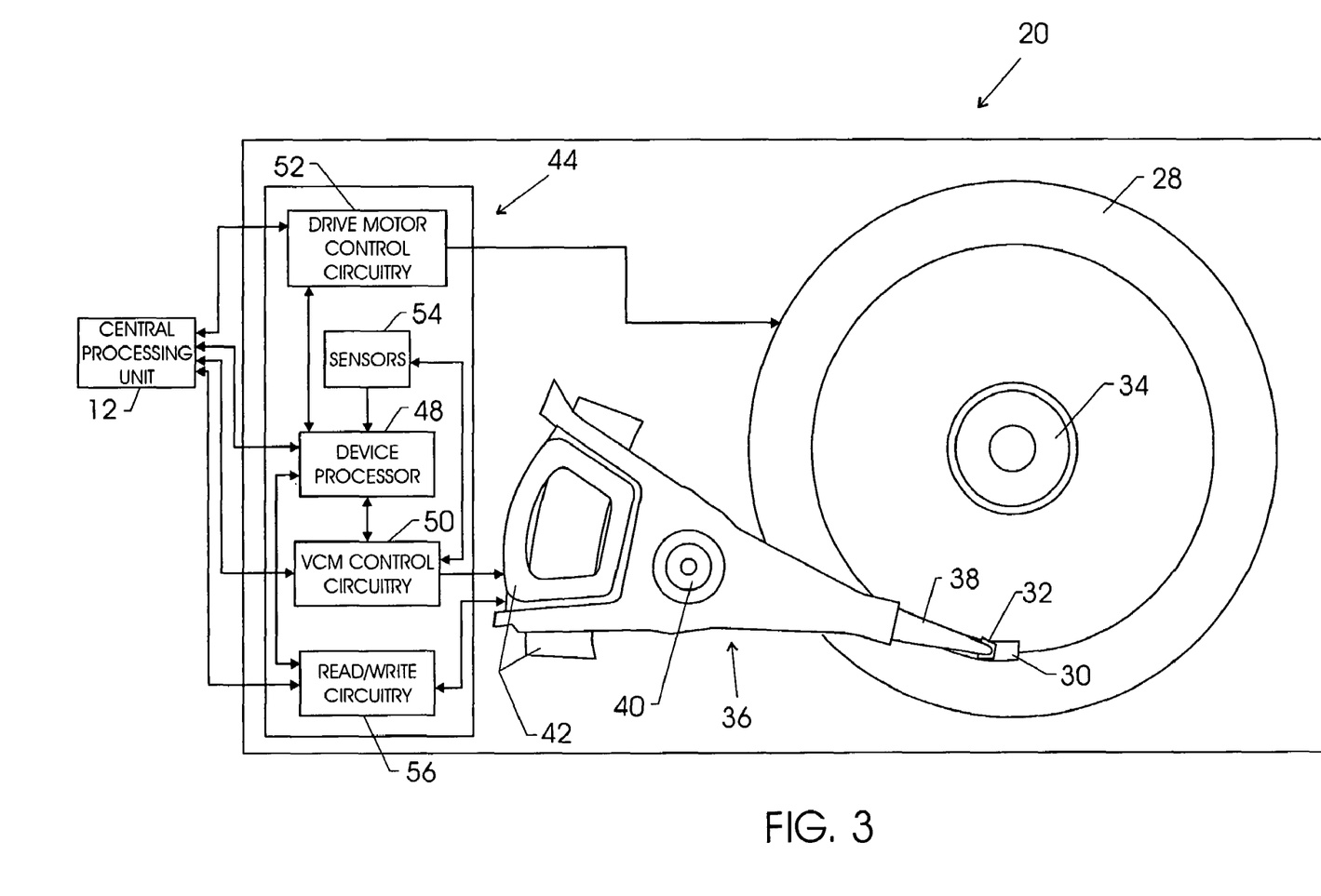
FIG. 3 is a top view of the data storage device of FIG. 2 illustrating, in diagrammatical form, an exemplary relationship of the data storage device to a computer system as well as to the data storage device's internal components in accordance with an embodiment of the present invention.

As illustrated in FIG. 3, the exemplary device circuitry 44 includes subcircuits having particularly assigned tasks. In the exemplary embodiment, the hard disk drive 20 sends and receives digital signals to and from the central processing unit 12 of the exemplary computer system 10 by way of a dedicated device processor 48, which may be a microprocessor. The dedicated device processor 48 may be configured to coordinate the internal operations of the disk drive 20 as well as communications with the central processing unit 12. Alternatively, the central processing unit 12 may bypass the device processor 48 and communicate directly with specific control circuits, such as voice coil motor (VCM) control circuitry 50 and drive motor control circuitry 52.

In the exemplary disk drive 20, the VCM control circuitry 50 (i.e., the actuation mechanism control circuitry) controls actuation of the arm 36 by directing the actuation mechanism, exemplified as the voice coil motor 42. The VCM control circuitry 50 may receive instructions from a number of locations. For example, the VCM control circuitry 50 receives instructions from the central processing unit 12 and/or from the device processor 48. Additionally, the exemplary disk drive 20 includes drive motor control circuitry 52 that controls operation of the spindle motor 34, thereby controlling the rate of rotation at the disks 28. The drive motor control circuitry 52 receives instructions from various locations. For example, the drive motor control circuitry 52 receives instructions from the central processing unit 12 and/or from the device processor 48. The exemplary disk drive 20 also includes one or more sensors 54 configured to detect operating conditions of the hard drive. By way of example, the sensors 54 may detect operating temperatures within the disk drive 20. The sensors 54 may communicate directly with the drive motor control circuitry 52 and/or VCM control circuitry 50 as well as with the device processor 48 and the central processing unit 12. Further, the drive motor control circuitry 52, the VCM control circuitry 50, and/or the sensors 54 may communicate with one another and with the central processing unit 12 in cooperation with or independent of the device processor 48.

In the exemplary disk drive 20, the device circuitry 44 includes read/write circuitry 56. The read/write circuitry 56 is electrically coupled to the data head 32 and controls the accessing (i.e., reading and/or writing) of data between the data head 32 and the respective disk 28. Moreover, the exemplary read/write circuitry 56 communicates with the central processing unit 12 to receive and transmit bits of data. Alternatively, however, the read/write circuitry 56 may communicate with the device processor 48, which is, in turn, in communication with the central processing unit 12.

Figure 4:
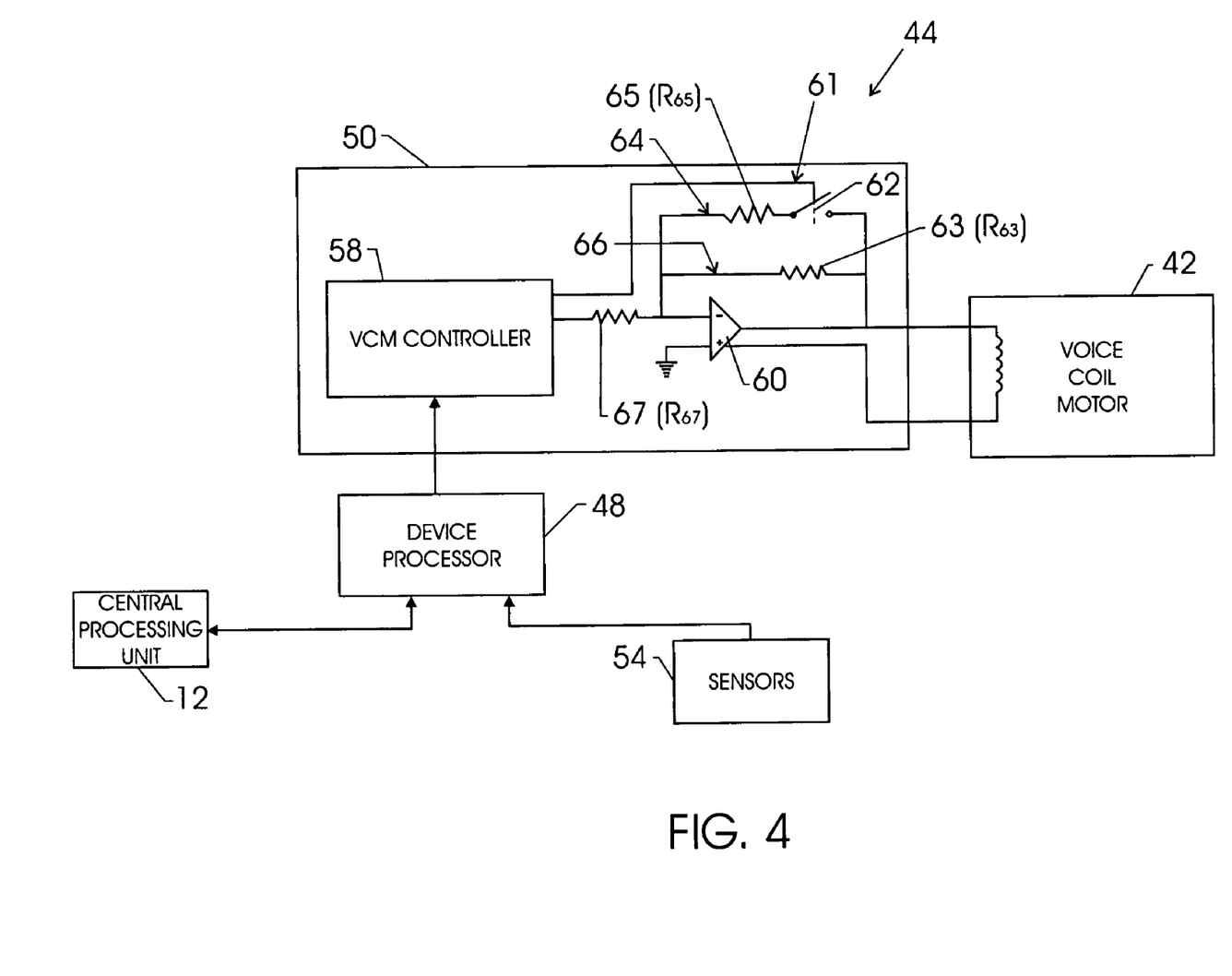
FIG. 4 is a schematic of an exemplary control circuit for a data storage device in accordance with an embodiment of the present invention.

Focusing on the VCM control circuitry 50, the voice coil motor 42 is controlled by a VCM controller 58 and an operational amplifier 60 as illustrated in FIG. 4. During operation, the VCM controller 58 receives digital signals from the device processor 48, the central processor 12, and/or temperature-sensing circuitry 54 and produces an analog signal in response. That is, the VCM controller 58 may function as a digital-to-analog converter (DAC), which are appreciated by those of ordinary skill in the pertinent art. During quiescent operation, the produced analog signal is received by an operational amplifier 60 that appropriately amplifies the analog voltage signal and directs the analog voltage signal to the voice coil motor 42. The voice coil motor 42 operates by producing a magnetic field that biases the actuator arm 36 (FIG. 3) in desired pivot directions. Accordingly, the larger the analog voltage signal from the amplifier 60, the larger the analog voltage signal to the VCM 42. The larger the analog voltage signal, the faster the actuation mechanism (e.g., the voice coil motor 42) actuates the arm 36, and, as such, the lower the seek time and the higher the performance level of the disk drive 20.

To change the performance level of the drive 20, the VCM controller 58 cooperates with a feedback circuit 61 that is bridged across the operational amplifier 60 and configured to reduce the voltage gain in the analog voltage signal to the voice coil motor 42. The VCM controller 58 controls a switch 62 located in a parallel feedback current path 64 of the feedback circuit 61 that closes the feedback current path 64. By increasing the amount of negative feedback to the operational amplifier 60, the voltage gain produced by the operational amplifier 60 is reduced. That is, the greater the amount of negative feedback applied by the feedback circuit 61, the smaller the voltage gain produced by the operational amplifier 60. By manipulating the voltage gain produced by the operational amplifier 60, the actuation rate of the arm 36 is also adjusted. Thus, by reducing the voltage gain produced by the operational amplifier 60, the disk drive 20 is manipulated to operate at a lower performance level. Operations at a lower performance level decreases the amount of power consumed and heat generated by the voice coil motor 42.

Operationally, when switch 62 is in the open position, only resistor 63 ($R_{63}$) of feedback path 66 applies a negative feedback to the voltage gain produced by the operational amplifier 60. That is, resistor 65 ($R_{65}$) of feedback path 64 does not apply negative feedback to the voltage gain produced by the operational amplifier 60. The gain produced by operational amplifier 60 is proportional to the ratio of the impedance value of $R_{63}$ to the impedance value of resistor 67 ($R_{67}$), which is located upstream of the operational amplifier 60 and feedback circuit 61 and is located downstream of the VCM controller 58. The voltage gain produced by the operational amplifier 60 is represented as shown below, wherein $V_O$ represents an output voltage (i.e., gain produced) and $V_1$ represents an input voltage:

$$V_0 = \frac{R_{63}}{R_{67}} V_I.$$

However, when switch 62 is in the closed position, current flows across $R_{65}$. Thus, both $R_{65}$ and $R_{63}$ apply a negative feedback to the voltage gain produced by the operational amplifier 60. Accordingly, the gain produced by the operational amplifier 60 is proportional to the impedance value of the entire feedback circuit 61 (i.e., $R_{63}$ and $R_{65}$ viewed as an equivalent resistor) to the impedance of $R_{67}$. The voltage gain produced by the operational amplifier 60 is represented as:

$$V_o = \frac{R_{63}(R_{65})}{(R_{63} + R_{65})(R_{67})}(V_I).$$

In light of the formula, it is clear that the value of the gain produced by the operational amplifier 60 when the switch is in the closed position is less than the value of the gain produced by the operation amplifier when the switch is in the open position, i.e., the denominator of the first formula is smaller than the denominator of the second formula. Again, by reducing the voltage gain produced by the operational amplifier 60, the disk drive 20 is taken to a lower performance level. Indeed, at this lowered performance level, operational temperatures of the disk drive 20 may be reduced by upwards of 30 to 40 percent. Additionally, power consumption of the disk drive may also be significantly reduced to upwards of 30 to 40 percent. During operation, reductions in heat generation or power consumption may be more desirable than optimizing performance. For the purpose of simplifying explanation, the feedback 61 circuit is explained above with reference to two resistors disposed electrically parallel with respect to one another. However, designs incorporating any number of circuit designs and resistor arrangements, including programmable and/or variable resistors, are envisaged. In other words, the disk drive 20 may operate at any number of performance levels. For example, by incorporating third and fourth feedback paths, which include switches and resistors, the drive 20 may operate at third and fourth performance levels. Thus, the disk drive 20 selectively accesses (i.e., reads and/or writes) data at third and fourth rates.

Figure 5:
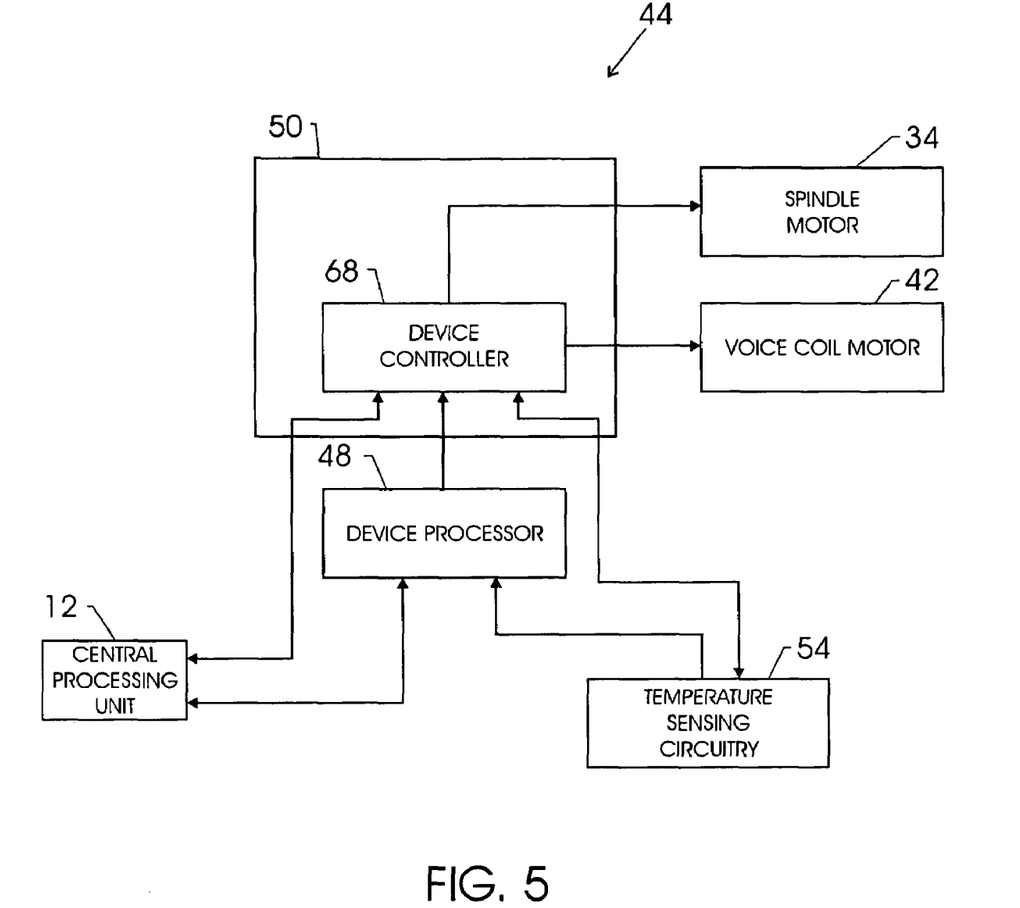
FIG. 5 is a schematic of an alternate, exemplary control circuit for a data storage device in accordance with an embodiment of the present invention.

Alternatively, as illustrated in FIG. 5, control of the voice coil motor 42 and the spindle motor 34 is conducted directly by a device controller 68, which is a digital-to-analog circuit. That is, the device controller 68 sends and receive digital signals to and from the device processor 48, the temperature-sensing circuitry 54, as well as the central processing unit 12, and sends an appropriate analog voltage signal to the voice coil motor 42 and/or spindle motor 34. However, the device controller 68 may also be configured to receive digital signals directly from the central processing unit 12 and the temperature-sensing circuitry 54 and to convert these signals into the appropriate analog signals for the spindle motor 34 and/or for the voice coil motor 42. In any event, by reducing the voltage signal to the voice coil motor 42, the actuation rate of the voice coil motor 42 is dynamically adjusted. For example, by reducing the actuation rate of the voice coil motor 42, the heat generated and the power consumed is reduced. Again, although this may reduce the performance level of the disk drive 20 (i.e., increase the seek time), reductions in heat generation and power consumption may be overriding concerns. As another example, if faster seek-time is more of a concern than power-consumption and/or heat generation, the disk drive 20 may operate at a high-performance level. For example, if the actuation mechanism, such as the voice coil motor 42, receives a higher voltage signal than quiescent operation, the disk drive 20 presents a faster accessing of data from the disk 28 because of the faster actuation of the arm 36. Moreover, the disk drive may operate at various performance levels (e.g., first, second, third, etc.) depending on the desired heat generation and/or power consumption concerns in conjunction with data seek-time parameters. That is, the disk drive 20 is capable of accessing data (i.e., reading and/or writing data) with respect to disk 28 at a number of performance levels that correlate to various data seek-times.

Figure 6:
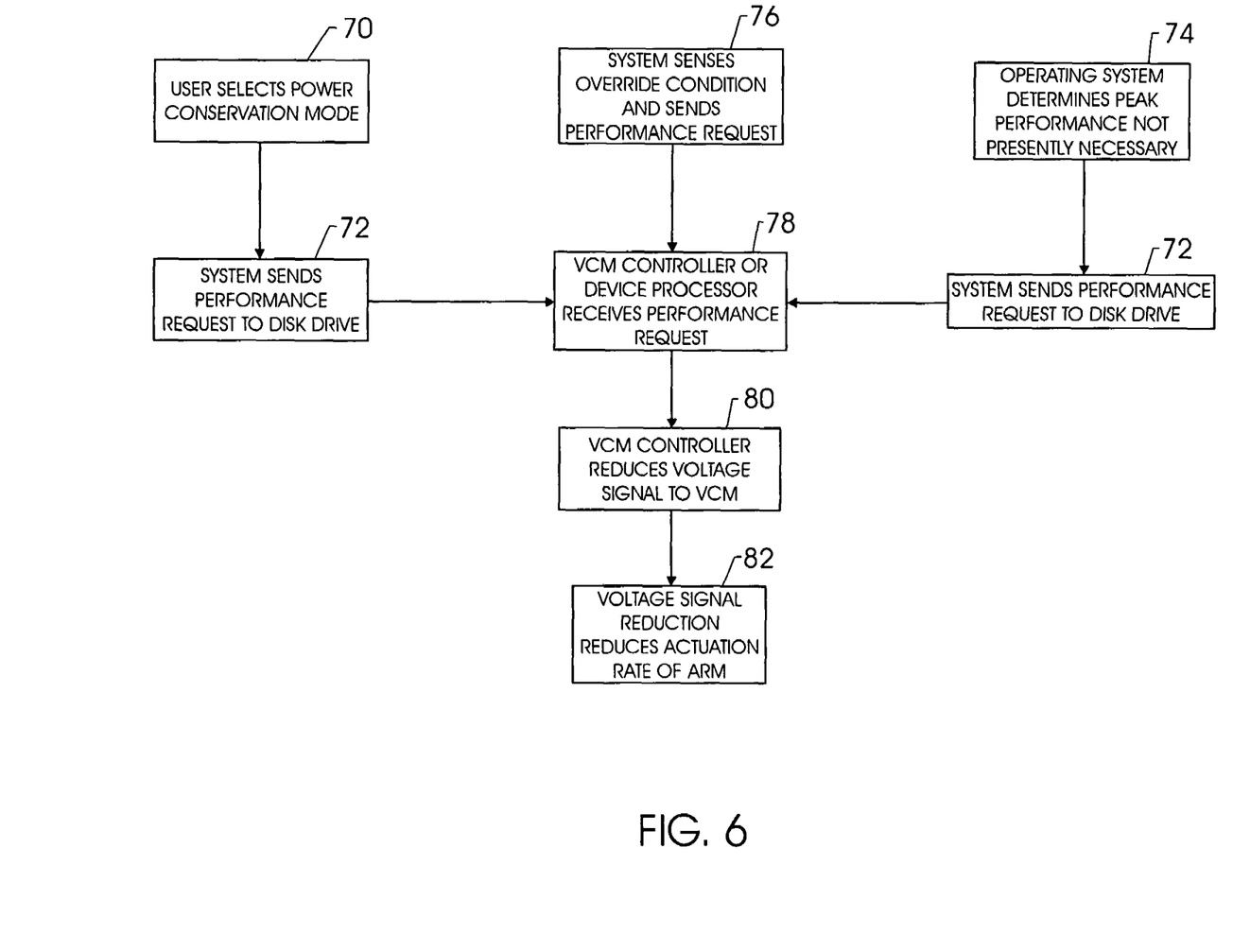
FIG. 6 is a flow chart illustrating exemplary operational protocols in accordance with an embodiment of the present invention.

During operation of the computer system 10 (FIG. 1), any number of events may affect the performance level of the hard disk drive 20 (FIG. 1). As illustrated in FIG. 6, exemplary protocols for the reduction of performance level of the disk drive 20 are illustrated in flow chart form. Along a first path, block 70 represents an operator-selected power conservation protocol chosen through the input device 16 (FIG. 1). For example, a laptop operator, in certain instances, may be more concerned with conserving battery power than operating at peak performance levels. Accordingly, the operator may request a power conservation protocol via a switch or graphical user interface (GUI), for example. As another example, the operator may select a profile or operating condition for the computer system 10. In response, the profile or selected condition may request performance of the disk-drive to be altered. That is, the profile or selected operating condition requests operation of the disk drive 20 at a higher or lower performance level, as appropriate. The central processing unit 12 (FIG. 1), in turn, sends the request to the disk drive 20, as represented by block 72. Once received by the disk drive 20, the performance level of the hard drive 20 is altered, if desired, in accordance with the performance request.

Alternatively, in accordance with a second exemplary protocol as represented by block 74, the operating system itself, i.e., without operator intervention, may determine that peak performance is unwarranted. For example, if the computer system 10 comprises a collection of servers, the operating system or a separate computer program may determine that power conservation is more desirable than reduced seek times. Indeed, when operating servers during off-peak hours (e.g., night time), the reduced number of users accessing the servers may permit the system to operate at lower performance levels. Furthermore, if the average utilization of the disk drive 20 is low, the operating system may determine that the disk drive 20 is not busy and reduce performance of the disk drive 20 by transitioning a low power mode. In other words, the need to access data quickly may be outweighed by the desire to conserve power. As another example, if the computer system 10 comprised a laptop computer, it may automatically switch to a power conservation mode anytime it is operating from its battery pack rather than its ac adapter. Accordingly, in such situations, the operating system may transmit a request for operation of the disk drive 20 at different performance levels (e.g., first, second, third, etc., performance levels). As yet another example, the operating system and/or the central processing unit presents a selectable profile. For example, the operating system may facilitate selection of or may select automatically an operating profile that instructs the disk drive to operate at a lower or higher performance level.

In accordance with a third exemplary protocol, as illustrated by block 76, the disk drive 20, via the sensors 54 for example, may sense an override condition and appropriately request reduction of the performance level of the disk drive 20. For example, the temperature-sensing circuitry 54 (FIGS.

4-5) may sense that the temperatures within the hard disk drive 20 have exceeded ideal operational parameters set by the exemplary protocol. Accordingly, the temperature-sensing circuitry (e.g., sensors 54) transmits a request for reducing performance levels of the drive 20. Indeed, operation of a drive at temperatures above a certain range may lead to damage of the drive causing partial or total failure. In yet another example, a laptop user may switch from ac power, provided by a standard wall socket, to dc battery power. The system 10, in accordance with a predetermined protocol, may sense this change and transmit a request to the disk drive 20 to conserve power. For example, the system may sense a low battery power condition and, in turn, request transition to a power conserving performance level.

The VCM controller 58 or device processor 48 receives the request from the appropriate location. Upon receipt of the request, the VCM controller 58 reduces voltage signal to the voice coil motor 42 as represented as block 80. In turn, as represented by block 82, the reduction in the voltage signal to the voice coil motor 42 reduces the actuation rate of the arm 36. Thus, the amount of power used by the actuation mechanism for the arm 36, e.g., the voice coil motor 42 is reduced. Moreover, the amount of heat generated by this actuation mechanism is also reduced.

Transitioning and control of an actuation mechanism of a data storage device, such as the exemplary disk drive 20, can be conducted by a computer program, which is disposed one or more tangible media, such as a floppy disk or compact disk (CD), or other types of storage media now known or will be known in the future. The exemplary computer program includes code for determining the operating condition of the data storage device. For example, the computer program can include code for interpreting and/or correlating the signal from a sensor 54 (see FIG. 3) with a certain operating condition, such as a low battery condition, an operating power type, for instance. As another example, the exemplary computer program can include code for receiving inputs indicative of a user designated operation condition. The exemplary computer code also includes code for transitioning the actuation mechanism from a first performance level to a second performance level in response to a determined operating condition.

What is claimed is:

1. A data storage device, comprising:
    actuation mechanism control circuitry configured to selectively operate an actuation mechanism for actuating a data head at first and second performance levels, wherein the first performance level accesses data from a data storage medium at a faster rate than the second performance level;
    wherein the first and second performance levels are selected by an operating system based on a utilization rate of the data storage device; and
    wherein the actuation mechanism control circuitry includes an operational amplifier and a plurality of feedback paths bridged across the operational amplifier.

2. The data storage device as recited in claim 1, wherein the actuation mechanism comprises a voice coil motor.

3. A computer system, comprising:
    a disk drive assembly, comprising:
        a data head coupled to a support structure and configured to read and write data with respect to a data storage disk; and
        an actuation mechanism selectably operable at first and second data accessing rates and configured to actuate the support structure to position the data head at a plurality of data locations on the data storage;
        wherein the actuation mechanism is configured to transition between data accessing rates by controlling the voltage gain produced by an operational amplifier; and
        wherein the first and second data accessing rates are selected by an operating system based on utilization of the disk drive.

4. The computer system as recited in claim 3, comprising a computing device including a processor and configured to receive and transmit data to and from the data storage disk.

5. The computer system as recited in claim 4, wherein the computing device comprises a laptop computer.

6. The computer system as recited in claim 4, wherein the computer device comprises a desktop computer.

7. The computer system as recited in claim 4, wherein the computer device comprises a server.

8. The computer system as recited in claim 3, comprising sensing circuitry configured to facilitate transition of the actuation mechanism between the first and second data accessing rates in response to an override condition.

9. The data storage device as recited in claim 1, wherein the actuation mechanism control circuitry is configured to selectively operate at a performance level based on inputs from a temperature sensor.

10. The computer system as recited in claim 3, wherein the actuation mechanism is configured to transition between data accessing rates based on inputs from a temperature sensor.

11. The data storage device of claim 1, at least one feedback path having an open and a closed state, the closed state corresponding to the second performance level and the open state corresponding to the first performance level.

* * * * *

UNITED STATES PATENT AND TRADEMARK OFFICE
CERTIFICATE OF CORRECTION

PATENT NO. : 7,609,472 B2 Page 1 of 1
APPLICATION NO. : 10/858193
DATED : October 27, 2009
INVENTOR(S) : Lee W. Atkinson It is certified that error appears in the above-identified patent and that said Letters Patent is hereby corrected as shown below:

In column 8, line 17, in Claim 3, delete "storage;" and insert -- storage disk; --, therefor.

Signed and Sealed this

Sixteenth Day of March, 2010

David J. Kappos
*Director of the United States Patent and Trademark Office*